United States Patent
Kume

(10) Patent No.: US 11,148,280 B2
(45) Date of Patent: Oct. 19, 2021

(54) ROBOT

(71) Applicant: FANUC CORPORATION, Yamanashi (JP)

(72) Inventor: Hirokazu Kume, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 95 days.

(21) Appl. No.: 16/704,309

(22) Filed: Dec. 5, 2019

(65) Prior Publication Data

US 2020/0238503 A1 Jul. 30, 2020

(30) Foreign Application Priority Data

Jan. 28, 2019 (JP) .............................. JP2019-011946

(51) Int. Cl.
*B25J 9/00* (2006.01)
*B25J 17/02* (2006.01)

(52) U.S. Cl.
CPC ............. *B25J 9/0009* (2013.01); *B25J 17/02* (2013.01)

(58) Field of Classification Search
CPC ... B25J 9/0009; B25J 9/06; B25J 9/102; B25J 9/1025; B25J 17/00; B25J 17/0241; B25J 19/0062; Y10S 901/15; Y10S 901/23; Y10S 901/25; Y10S 901/28; Y10T 74/20305; Y10T 74/20317
See application file for complete search history.

(56) References Cited

U.S. PATENT DOCUMENTS 7,752,939 B2 * 7/2010 Ono ....................... F16H 21/04
74/490.03

FOREIGN PATENT DOCUMENTS

JP 2008-073775 A 4/2008
JP 4208169 B 1/2009

* cited by examiner

*Primary Examiner* — Bobby Rushing, Jr.
(74) *Attorney, Agent, or Firm* — Maier & Maier, PLLC

(57) ABSTRACT

A robot including, a motor attached to one end surface of a casing of an arm, a reducer output shaft attached to the other end surface of the casing by bolts, a hole provided in the casing, and through which the output shaft of the motor is inserted, a first sealing member sealing a space between the hole and the output shaft, a second sealing member sealing a space between the other end surface and the end surface of the reducer output shaft, a recessed portion provided on a side of the other end surface of the casing and recessed in a direction along the central axial line of the reducer output shaft; and a lubricant agent supply hole provided in the casing and extending in a substantially radial direction or in a radial direction of the reducer output shaft, the lubricant agent supply hole communicating to the recessed portion.

3 Claims, 6 Drawing Sheets

ROBOT

CROSS-REFERENCE TO RELATED APPLICATIONS

This application is based on and claims priority to Japanese Patent Application No. 2019-011946 filed on Jan. 28, 2019, the content of which is incorporated herein by reference in its entirety.

FIELD

The present invention relates to a robot.

BACKGROUND

Conventionally, there is known a 6-axis articulated robot in which a third arm member is supported by a second arm member of the 6-axis articulated robot via a reducer, and a servo motor for supplying a driving force to the reducer is fixed to the second arm member (cf., Japanese Patent No. 4208169).

SUMMARY

A first aspect of this disclosure provides a robot having an arm, the robot including, a motor attached to one end surface of a casing of the arm, a reducer output shaft attached to the other end surface facing a side opposite from the one end surface of the casing, using a plurality of attachment bolts, the reducer output shaft having a central axial line parallel to an output shaft of the motor, a hole which is provided in the casing and through which the output shaft is inserted from the one end surface to the other end surface, a first sealing member attached to the casing, the first sealing member sealing a space between the hole and an outer peripheral surface of the output shaft, a second sealing member sealing a space between the other end surface of the casing and an end surface of the reducer output shaft;

a recessed portion provided on a side of the other end surface of the casing, the recessed portion being recessed in a direction along the central axial line, and a lubricant agent supply hole provided in the casing and extending in a substantially radial direction or in a radial direction of the reducer output shaft, the lubricant agent supply hole connecting an exterior of the casing with the recessed portion, wherein the reducer output shaft is provided with a plurality of thread holes respectively threaded with the plurality of attachment bolts, the second sealing member is disposed inward from the plurality of thread holes, the lubricant agent supply hole includes at least one of an outside opening and an inside opening, the outside opening being provided on a side of the exterior of the casing, the inside opening being provided on a side of the recessed portion, and in a direction along the central axial line, the first sealing member and the second sealing member are disposed at a side of the reducer output shaft relative to at least one of the outside opening and the inside opening of the lubricant agent supply hole.

DETAILED DESCRIPTION

Hereinafter, a robot 1 according to one embodiment shall be described with reference to the drawings.

Figure 1:
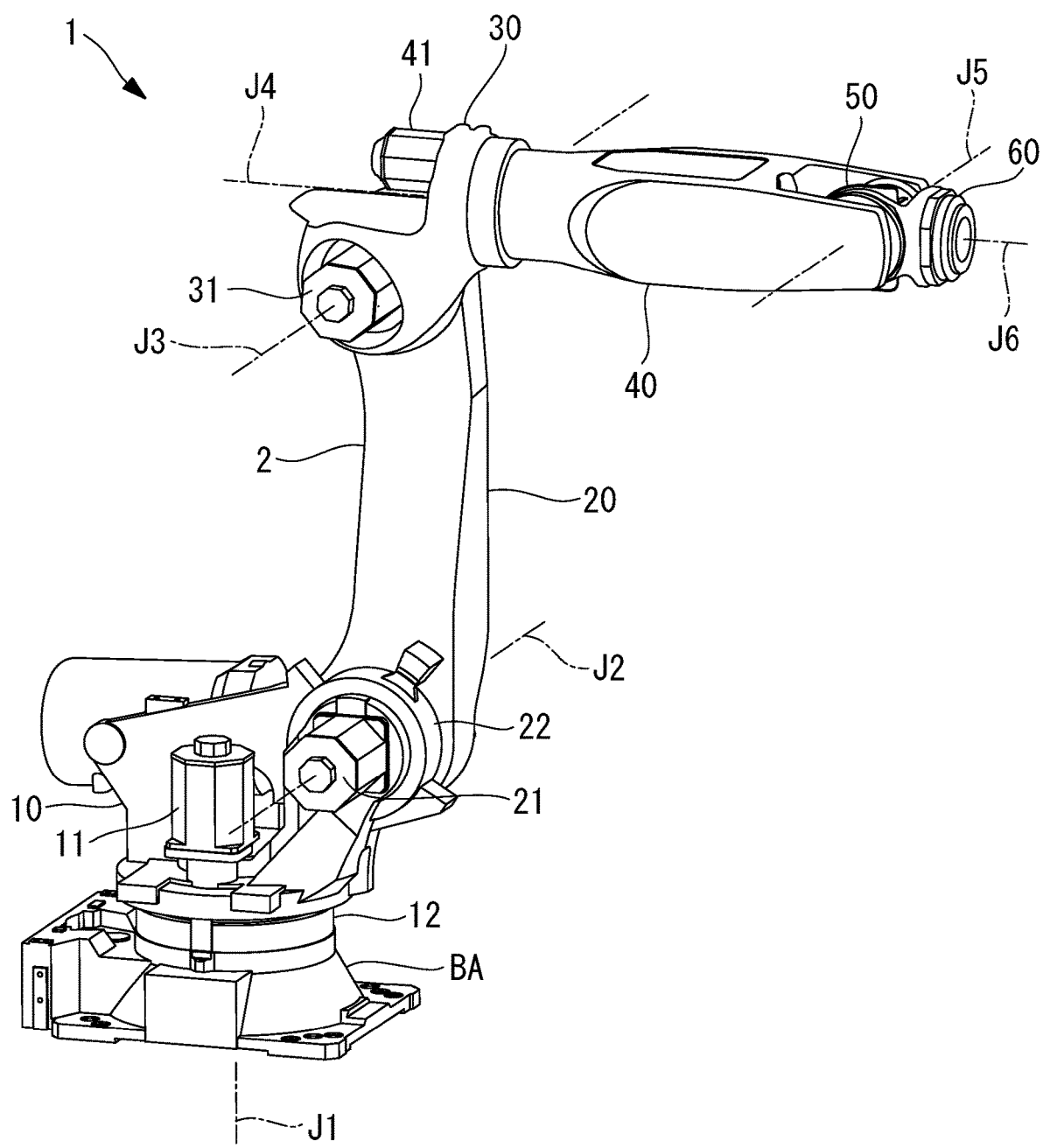
FIG. 1 is a perspective view of a robot according to one embodiment.

As shown in FIG. 1, the robot 1 according to this embodiment includes an arm 2, and an arbitrary tool is attached to a tip portion of the arm 2. While the robot 1 according to this embodiment is a 6-axis articulated robot, the robot 1 may be a 7-axis articulated robot or an articulated robot of a different type.

As shown in FIG. 1, the arm 2 includes: a first arm member 10 supported, rotatably about a first axial line J1 extending in a vertical direction, on a base BA fixed on a predetermined installation surface; a second arm member 20 supported by its base end side, swingably about a second axial line J2 extending in a horizontal direction, by the first arm member 10; and a third arm member 30 supported by its base end side, swingably about a third axial line J3 extending in a horizontal direction, on a distal end side of the second arm member 20.

The arm 2 also includes: a fourth arm member 40 supported by the third arm member 30, rotatably about a fourth axial line J4 extending in a direction orthogonal to a line parallel to the third axial line J3; a fifth arm member 50 supported by the fourth arm member 40, swingably about a fifth axial line J5 extending in a direction orthogonal to the fourth axial line J4; and a sixth arm member 60 supported by the fifth arm member 50, rotatably about a sixth axial line J6.

The arm 2 further includes: a plurality of servo motors (motors) 11, 21, 31, and 41 that respectively drive the first to fourth arm members 10-40, as well as servo motors that respectively drive the fifth arm member 50 and the sixth arm member 60. As the servo motors, various types of servo motors including rotary motors and linear motors may be used.

Next, a configuration of the arm 2 will be described.

As shown in FIG. 1, the first arm member 10 is attached, using a plurality of bolts, to a shaft of a reducer 12 for driving the first arm member 10, and the reducer 12 is fixed to the base BA. Further, the base end side of the second arm member 20 is attached, using a plurality of bolts, to a reducer 22 for driving the second arm member 20, and the reducer 22 is fixed to the first arm member 10.

Figure 2:
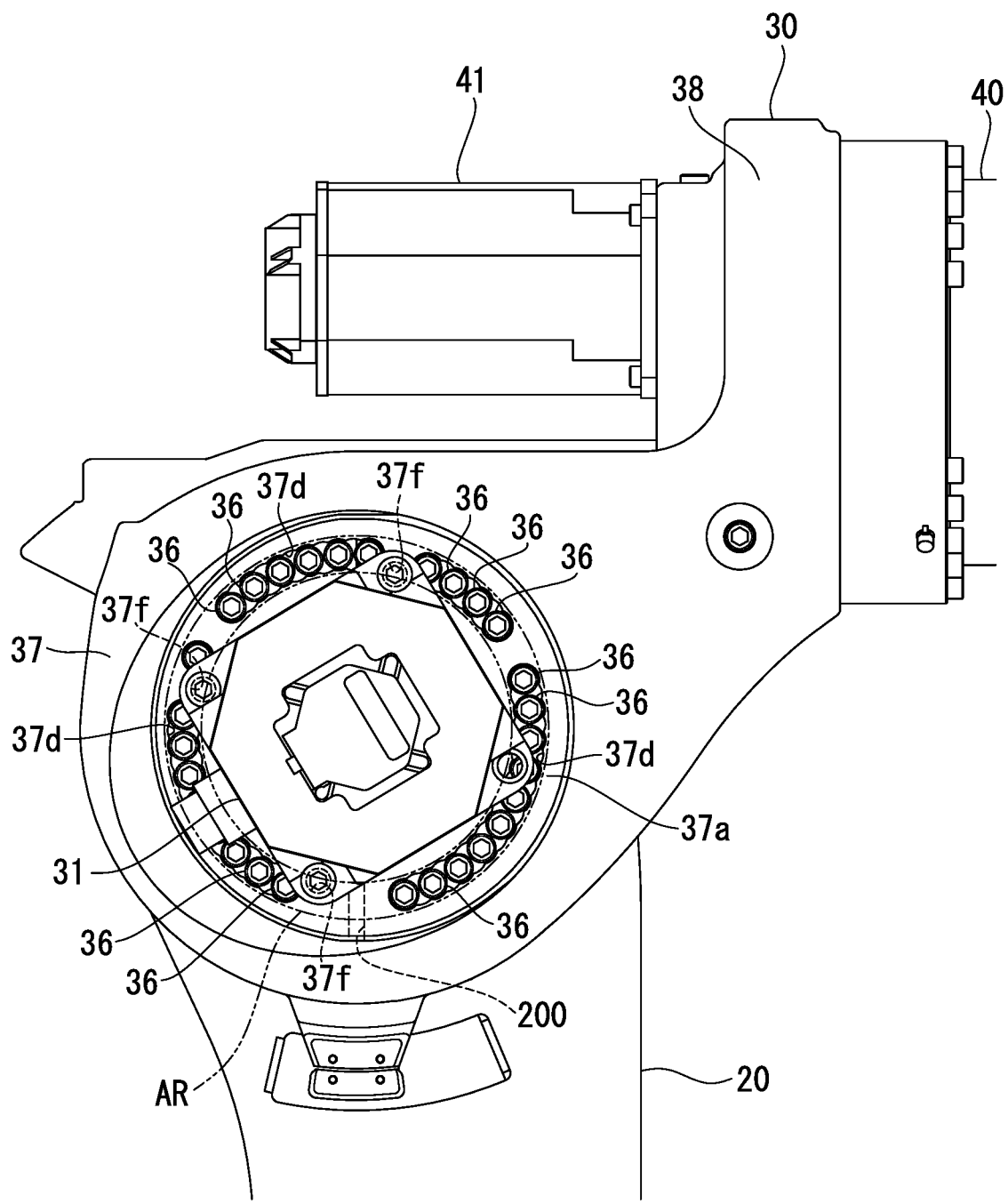
FIG. 2 is a front view of a main part of the robot according to this embodiment.
Figure 3:
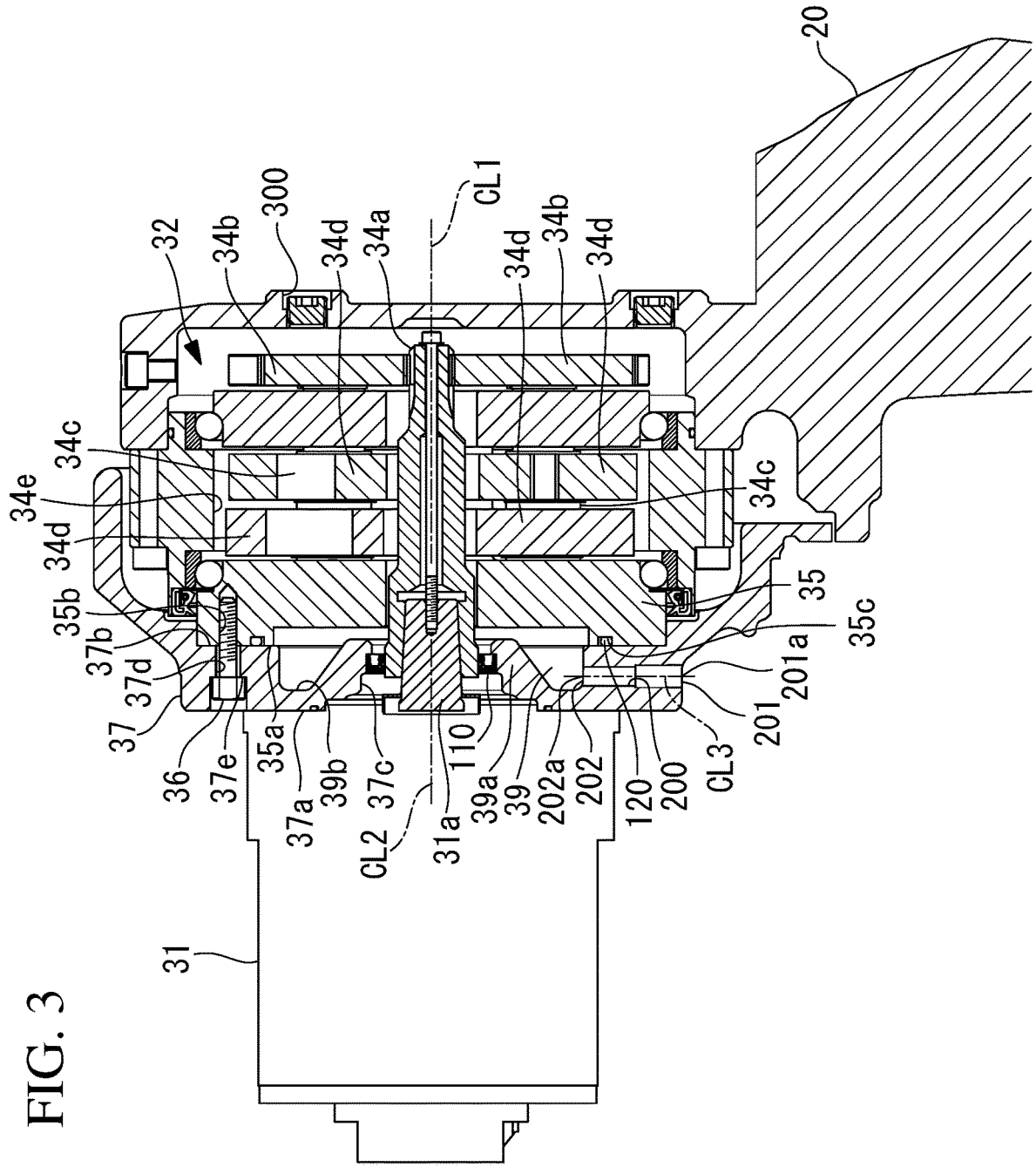
FIG. 3 is a sectional view of the main part of the robot according to this embodiment.

As shown in FIGS. 2 and 3, to the third arm member 30, a reducer output shaft 35 of a reducer 32 for driving the third arm member 30 is attached using a plurality of attachment bolts 36, and the reducer 32 is fixed to a tip portion of the second arm member 20.

As shown in FIG. 3, the reducer 32 is a known reducer having components such as: an input gear 34a fixed to an output shaft 31a of the servo motor 31; a plurality of spur gears 34b that mesh with the input gear 34a; a plurality of crankshafts 34c each having one end to which each of the plurality of spur gears 34b is fixed; eccentric gears 34d respectively attached to the crankshafts 34c; an internal gear 34e that rotates by being meshed with the eccentric gears 34d; and the reducer output shaft 35 that rotates according to the rotation of the internal gear 34e. As the reducer 32, Precision Reduction Gear RV available from Nabtesco Corporation may be used, as one example. It should be noted that Cyclo reducer available from Sumitomo Heavy Industries, Ltd. may also be used.

As shown in FIGS. 2 and 3, the third arm member 30 includes a casing 37, to which the reducer output shaft 35 is attached using the plurality of attachment bolts 36. Typically, the casing 37 is made from metal, and the servo motor 31 is attached to one end surface 37a of the casing 37 using a bolt B. The casing 37 may be configured integrally with a casing 38 to which the servo motor 41 for the fourth arm member 40 is fixed, or may be provided separately. The casings 37 and 38 of the third arm member 30 also support the fourth arm member 40.

In the casing 37, the reducer output shaft 35 is attached to the other end surface 37b facing a side opposite from the one end surface 37a, using the plurality of attachment bolts 36. More specifically, an end surface 35a of the reducer output shaft 35 is provided with a plurality of thread holes 35b, and the reducer output shaft 35 is attached to the other end surface 37b by threading the plurality of attachment bolts 36 respectively with the thread holes 35b. With this, the end surface 35a of the reducer output shaft 35 is brought into surface contact with the other end surface 37b.

A central axial line CL1 of the output shaft 31a of the servo motor 31 and a central axial line CL2 of the reducer output shaft 35 are perpendicular to the one end surface 37a and the other end surface 37b, and the central axial line CL1 is parallel to the central axial line CL2. In this embodiment, the output shaft 31a and the reducer output shaft 35 are coaxial. However, the central axial line CL1 of the output shaft 31a may be at a position displaced from the central axial line CL2 in a radial direction of the reducer output shaft 35. In this case, similarly, the function of the reducer 32 is realized if a rotative force of the input gear 34a is transmitted to the plurality of spur gears 34b by other gears.

Figure 6:
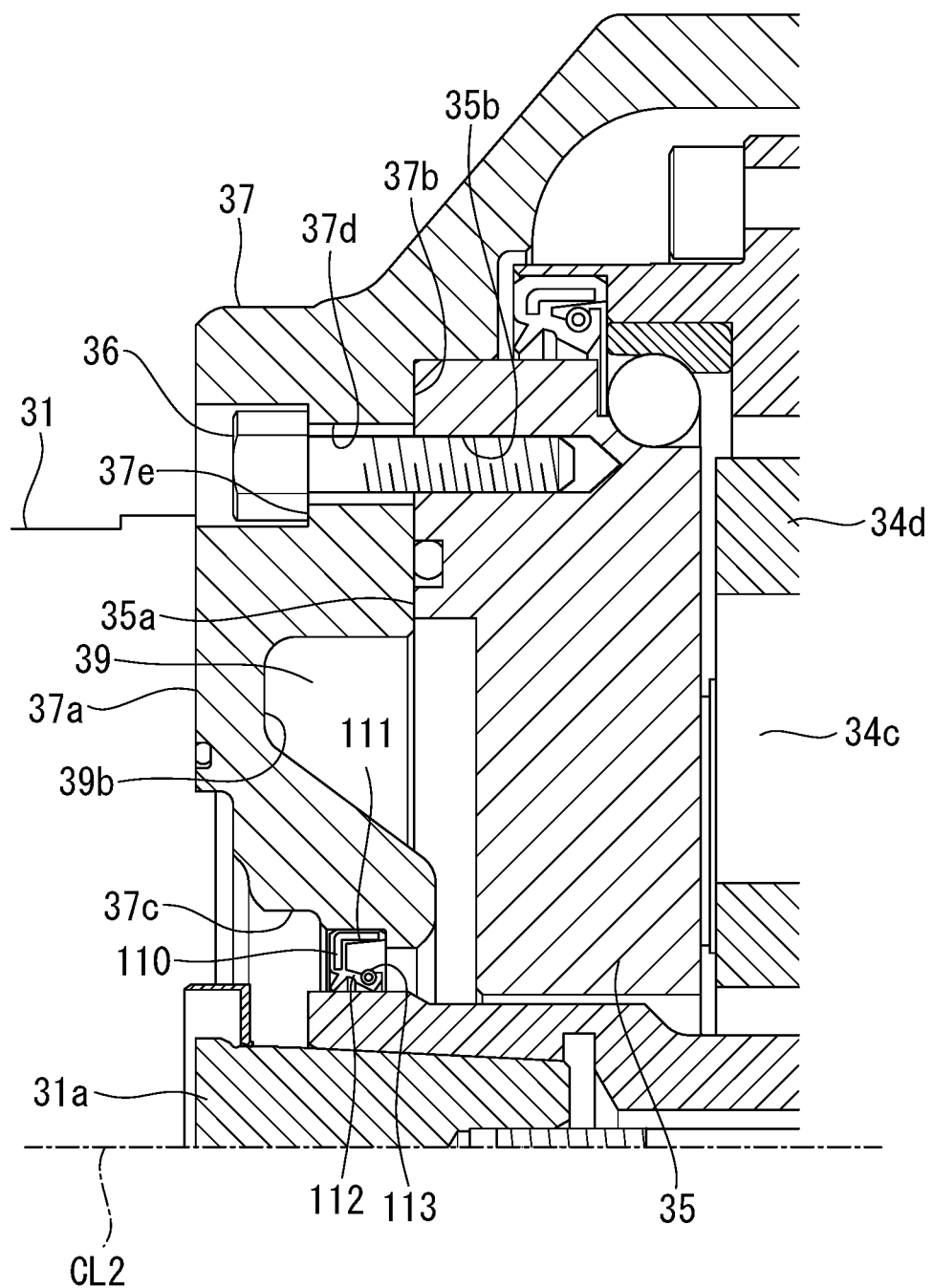
FIG. 6 is a sectional view of the main part of the robot according to this embodiment.

The casing 37 is provided with a hole 37c that penetrates the casing 37 from the one end surface 37a to the other end surface 37b. The hole 37c is provided coaxially with the output shaft 31a, and a first sealing member 110 is fixed to an inner peripheral surface of the hole 37c. One example of the first sealing member 110 is an oil seal. As shown in FIG. 6, the first sealing member 110 includes: a base portion 111 fitted into the inner peripheral surface of the hole 37c; and a lip portion 112 that extends radially inward from the base portion 111.

Within the base portion 111, a metal ring is provided, for example. The lip portion 112 is made from a material with oil resistance, examples of which include materials with rubber-like elasticity such as nitrile-butadiene rubber (NBR), acrylic rubber (ACM), fluorine-containing rubber, and silicon rubber. A tip end of the lip portion 112 is in contact with an outer peripheral surface of the output shaft 31a. Further, to an outer peripheral surface of the lip portion 112, a ring-shaped spring 113 for pressing the lip portion 112 against the outer peripheral surface of the output shaft 31a is attached. The first sealing member 110 is a member for preventing a lubricant agent such as grease from coming into a side of the one end surface 37a from a side of the other end surface 37b.

Figure 4:
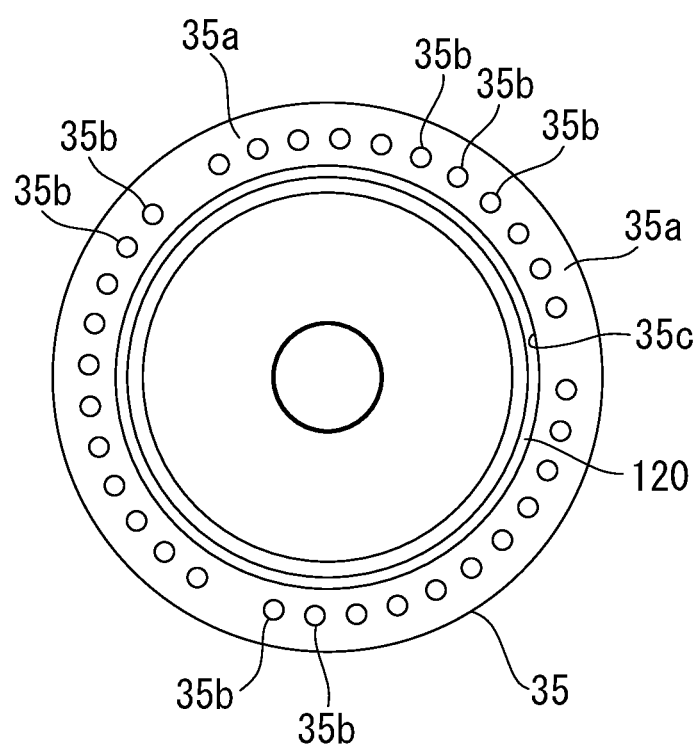
FIG. 4 shows a reducer output shaft, viewed in an axial direction, of a reducer of the robot according to this embodiment.

A space between the end surface 35a of the reducer output shaft 35 and the other end surface 37b is sealed by a second sealing member 120. More specifically, the end surface 35a of the reducer output shaft 35 is provided with an O-ring groove 35c, and an O-ring as the second sealing member 120 is disposed within the O-ring groove 35c. The O-ring groove 35c and the second sealing member 120 are provided along an entire circumference around the central axial line CL2. As shown in FIG. 4, the O-ring groove 35c and the second sealing member 120 are disposed on the inner side relative to the plurality of thread holes 35b. If the second sealing member 120 is disposed on the outer side relative to the thread holes 35b, a lubricant agent within the reducer 32 leaks through bolt holes 37d in the casing 37. Therefore, a sealing structure may not be achieved. Here, it is preferable that the O-ring groove 35c and the second sealing member 120 are disposed on the inner side relative to the motor thread holes 37f for the servo motor 31 shown in FIG. 1. The motor thread holes 37f are defined in the casing 37. When the motor thread holes 37f are disposed in a circular fashion, outer diameters of the O-ring groove 35c and the second sealing member 120 are smaller than a PCD of the motor thread holes 37f.

As the second sealing member 120, it is possible to use a ring-shaped sealing member that may be disposed without using the O-ring groove 35c. In this case, similarly, the sealing member is made from a material having rubber-like elasticity as described above. Further, such a sealing member is disposed at a lowered surface or the like provided in the end surface 35a of the reducer output shaft 35. Thus, the sealing member may not be flattened completely when the end surface 35a is brought into surface contact with the other end surface 37b. It is possible to use a sealing member of a different type as the second sealing member 120.

On the side of the other end surface 37b of the casing 37, a portion 39 that is recessed in a direction along the central axial line CL2 is provided. The recessed portion 39 is disposed on the radially inner side relative to the O-ring groove 35c and the second sealing member 120. In this embodiment, the recessed portion 39 is provided along an entire circumference around the central axial line CL2. However, the recessed portion 39 may be provided only along a part of the circumference of the central axial line CL2. In this case, the recessed portion 39 is provided in a form of a hole.

A cylindrical projecting portion 39a is provided on a side closer to the central axial line CL2 of the recessed portion 39. The projecting portion 39a projects from a bottom surface 39b of the recessed portion 39 toward the reducer output shaft 35 in the direction along the central axial line CL2. An inner hole of the projecting portion 39a serves as the hole 37c described above. In this embodiment, in the direction along the central axial line CL2, the first sealing member 110 is disposed at a side of the reducer output shaft 35 relative to the bottom surface 39b.

The casing 37 is provided with a lubricant agent supply hole 200. The lubricant agent supply hole 200 extends in a radial direction of the reducer output shaft 35, and connects an exterior of the casing 37 with the recessed portion 39. As one example, the lubricant agent supply hole 200 is provided by defining a hole in the casing 37 by drilling or the like. The lubricant agent supply hole 200 has an outside opening 201 opening to the outside of the casing 37, and an inside opening 202 opening to the inside of the recessed portion 39. The outside opening 201 may have a cover member, an adapter connected to an injector for a lubricant agent, and the like.

In this embodiment, in the direction along the central axial line CL2, the first sealing member 110 and the second sealing member 120 are disposed on the right side relative to the center 201a of the outside opening 201 and the center 202a of the inside opening 202. As one example, the center 201a and the center 202a are respective centers of the outside opening 201 and the inside opening 202. In the following, a description is given assuming that the center 201a and the center 202a are positions of the outside opening 201 and the inside opening 202.

When a lubricant agent such as grease is supplied to the reducer 32, the lubricant agent is injected through the lubricant agent supply hole 200. If a lubricant agent discharge hole 300 provided in the second arm member 20 is open at this time, injection is carried out smoothly. The lubricant agent discharge hole 300 may be provided in the casings 37 and 38 of the third arm member 30.

When the lubricant agent in the reducer 32 is replaced, a lubricant agent is injected through the lubricant agent supply hole 200 in a state in which the lubricant agent discharge hole 300 is open. With this, a new lubricant agent is supplied into the reducer 32 through the lubricant agent supply hole 200, and the old lubricant agent is discharged through the lubricant agent discharge hole 300.

Here, attachment structure and lubricant agent supply structure between the base end side of the second arm member 20 and the reducer 22, and attachment structure and lubricant agent supply structure between the first arm member 10 and the reducer 12 may be configured in the same manner as described above. Similarly, when constructing a robot in which a shaft of a reducer is attached to the remaining arm members 40-60, attachment structure and lubricant agent supply structure between the arm members 40-60 and the reducer may be configured in the same manner as described above.

Figure 5:
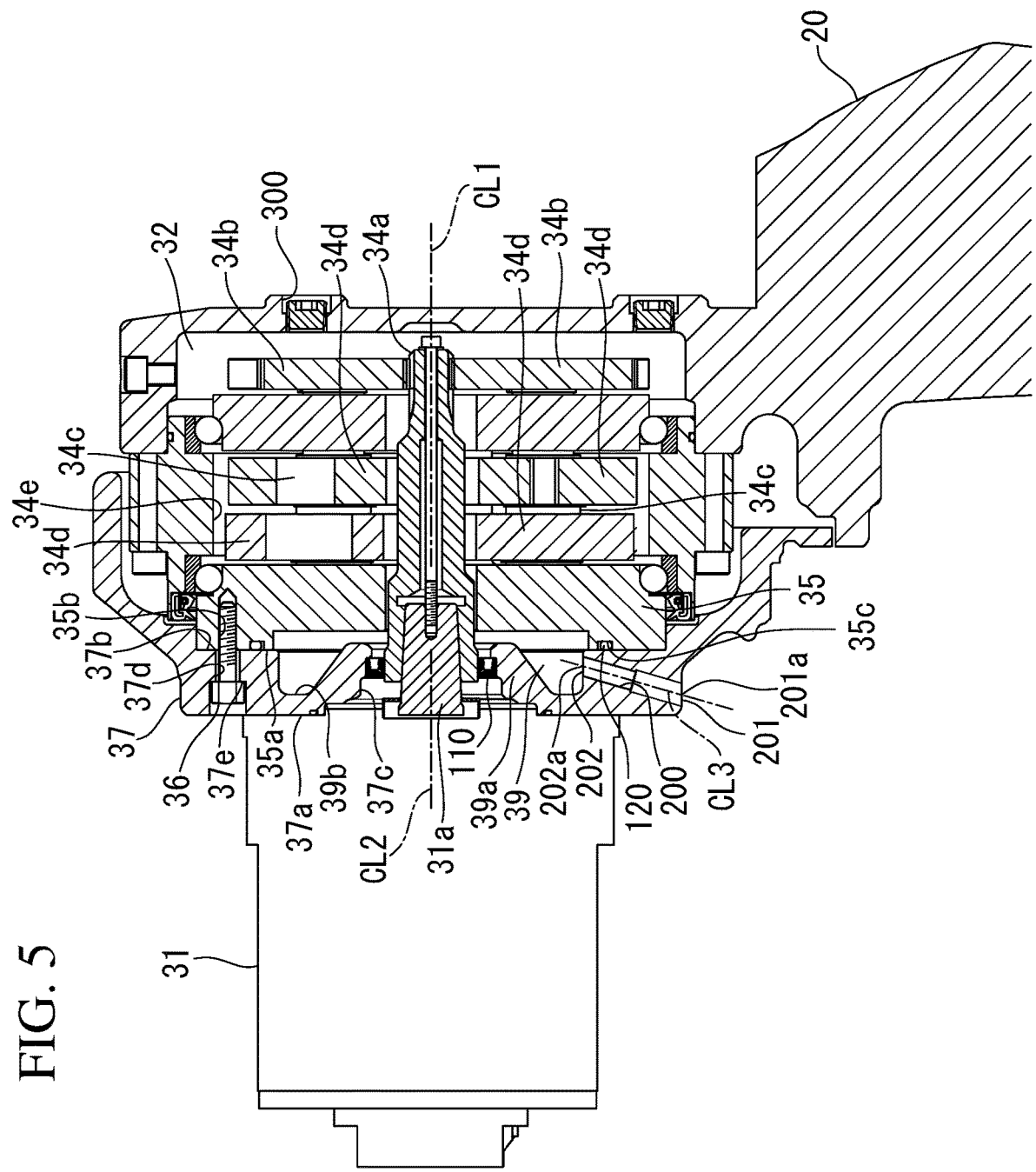
FIG. 5 is a sectional view of a main part of a modified example of the robot according to this embodiment.

Further, as shown in FIG. 5, the lubricant agent supply hole 200 may extend substantially in a radial direction of the reducer output shaft 35. The lubricant agent supply hole 200 is assumed to extend substantially in a radial direction of the reducer output shaft 35, when an angle between a line parallel to the central axial line CL2 and a central axial line CL3 of the lubricant agent supply hole 200 is 45 degrees or greater. Here, it is preferable that an angle between the line parallel to the central axial line CL2 and the central axial line CL3 is 70 degrees or greater.

In this case, in the direction along the central axial line CL2, the first sealing member 110 and the second sealing member 120 are disposed at the side of the reducer output shaft 35 relative to a position of the outside opening 201 of the lubricant agent supply hole 200.

Further, the lubricant agent supply hole 200 may be used as a discharge hole for discharging oil. For example, oil as a lubricant agent is injected through the lubricant agent discharge hole 300 or the like, and the injected oil is discharges through the lubricant agent supply hole 200.

In this embodiment, the space between the end surface 35a of the reducer output shaft 35 and the other end surface 37b of the casing 37 is sealed by the second sealing member 120, and a space between the output shaft 31a of the motor 31 and the hole 37c of the casing 37 is sealed by the first sealing member 110. Further, the second sealing member is disposed on the inner side relative to the plurality of thread holes 35b of the reducer output shaft 35. Therefore, it is possible to ensure sealing of a lubricant agent between the reducer output shaft 35 and the casing 37 without using a sealing agent.

Moreover, the casing 37 is provided with the lubricant agent supply hole 200 extending in a radial direction or in a substantially radial direction of the reducer output shaft 35. Furthermore, in the direction along the central axial line CL2, the first sealing member 110 and the second sealing member 120 are disposed closer to the reducer output shaft 35 relative to at least one of the outside opening 201 and the inside opening 202 of the lubricant agent supply hole 200.

The above configuration is advantageous in order to reduce a size of the reducer 32 in the direction along the central axial line CL2. In addition, a distance between the first sealing member 110 and the servo motor 31 in the direction along the central axial line CL2 is increased. With this, even when the lubricant agent slightly leaks from the first sealing member 110, it is possible to reduce possibility that the lubricant agent may affect the servo motor 31.

Further, in this embodiment, as shown in FIG. 2, the lubricant agent supply hole 200, when viewed in the direction along the central axial line CL2, passes through an area AR in which the attachment bolts 36 are arranged. The above configuration is advantageous in order to improve a degree of freedom for a size of the casing 37 in the direction along the central axial line CL2.

Moreover, in this embodiment, the recessed portion 39 is provided with the cylindrical projecting portion 39a that projects from the bottom surface 39b toward the reducer output shaft 35, and the hole 37c in which the output shaft 31a of the servo motor 31 is inserted is an inner hole of the projecting portion 39a. Further, in the direction along the central axial line CL2, the first sealing member 110 is disposed at a side of the reducer output shaft 35 relative to the bottom surface 39b of the recessed portion 39.

The above configuration is advantageous in order to increase a distance between the first sealing member 110 and the servo motor 31 in the direction along the central axial line CL2.

It should be noted that, in this embodiment, counterbores are provided in the bolt holes 37d, and bottom surfaces 37e of the counterbores serve as respective bearing surfaces of the corresponding attachment bolts 36. Here, it is preferable that as shown in FIG. 3, in the direction along the central axial line CL2, the bottom surfaces 37e are each disposed at a position that is substantially the same as a position of the central axial line CL3 of the lubricant agent supply hole 200, or disposed at the side of the reducer output shaft 35 relative to the central axial line CL3. When the central axial line CL3 is inclined as shown in FIG. 5, it is preferable that the bottom surfaces 37e are disposed at the side of the reducer output shaft 35 relative to the center 201a of the outside opening 201 or from the center 202a of the inside opening 202 of the lubricant agent supply hole 200.

With this configuration, the position of the lubricant agent supply hole 200 and positions of heads of the attachment bolts 36 become close in the direction along the central axial line CL2. This is advantageous in order to reduce a size of this joint of the robot 1 in the direction along the central axial line CL2.

With the above-described disclosure, it is possible to ensure sealing of a lubricant agent between a shaft of a reducer and a casing of an arm member, as well as to reduce the size of the reducer in the axial direction.

The invention claimed is:
1. A robot, comprising:
an arm;
a motor attached to one end surface of a casing of the arm;
a reducer output shaft attached to the other end surface facing a side opposite from the one end surface of the casing, using a plurality of attachment bolts, the reducer output shaft having a central axial line parallel to an output shaft of the motor;
a hole which is provided in the casing and through which the output shaft is inserted from the one end surface to the other end surface;

a first sealing member attached to the casing, the first sealing member sealing a space between the hole and an outer peripheral surface of the output shaft;

a second sealing member sealing a space between the other end surface of the casing and an end surface of the reducer output shaft;

a recessed portion provided on a side of the other end surface of the casing, the recessed portion being recessed in a direction along the central axial line; and a lubricant agent supply hole provided in the casing and extending in a substantially radial direction or in a radial direction of the reducer output shaft, the lubricant agent supply hole connecting an exterior of the casing with the recessed portion, wherein the reducer output shaft is provided with a plurality of thread holes respectively threaded with the plurality of attachment bolts, the second sealing member is disposed inward from the plurality of thread holes, the lubricant agent supply hole includes at least one of an outside opening and an inside opening, the outside opening being provided on a side of the exterior of the casing, the inside opening being provided on a side of the recessed portion, and in a direction along the central axial line, the first sealing member and the second sealing member are disposed at a side of the reducer output shaft relative to at least one of the outside opening and the inside opening of the lubricant agent supply hole.

2. The robot according to claim 1, wherein
the lubricant agent supply hole passes, when viewed in the direction along the central axial line, through an area in which the attachment bolts are arranged.

3. The robot according to claim 1, wherein
the recessed portion is provided with a cylindrical projecting portion that projects from a bottom surface of the recessed portion toward the reducer output shaft, the hole through which the output shaft is inserted from the one end surface to the other end surface is an inner hole of the projecting portion, and in the direction along the central axial line, the first sealing member is disposed at a side of the reducer output shaft relative to the bottom surface.

* * * * *